United States Patent
Jing et al.

(10) Patent No.: US 7,235,302 B2
(45) Date of Patent: Jun. 26, 2007

(54) FLUOROPOLYMER BONDING COMPOSITION AND METHOD

(75) Inventors: Naiyong Jing, Woodbury, MN (US); Trang D. Pham, Bloomington, MN (US); Andrew M. Hine, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 56 days.

(21) Appl. No.: 10/647,523

(22) Filed: Aug. 25, 2003

(65) Prior Publication Data

US 2004/0058161 A1    Mar. 25, 2004

Related U.S. Application Data

(62) Division of application No. 09/862,022, filed on May 21, 2001, now Pat. No. 6,630,047.

(51) Int. Cl.
*B32B 7/10* (2006.01)
*B32B 15/08* (2006.01)
*B32B 17/10* (2006.01)
*B32B 27/18* (2006.01)

(52) U.S. Cl. ............... 428/420; 428/421; 428/422; 428/426; 428/457

(58) Field of Classification Search ........... 428/421, 428/422, 426, 457, 420
See application file for complete search history.

(56) References Cited

U.S. PATENT DOCUMENTS

| | | | |
|---|---|---|---|
| 2,789,063 A | 4/1957 | Purvis et al. | |
| 3,309,425 A * | 3/1967 | Gulham et al. | 524/116 |
| 3,563,871 A | 2/1971 | Newman et al. | |
| 4,112,139 A | 9/1978 | Shirk et al. | |
| 4,151,154 A * | 4/1979 | Berger | 523/203 |
| 4,164,463 A | 8/1979 | Fang | |
| 4,186,084 A | 1/1980 | Fang | |
| 4,233,421 A | 11/1980 | Worm | |
| 4,261,800 A | 4/1981 | Beckenbaugh et al. | |
| 4,338,237 A | 7/1982 | Sulzbach et al. | |
| 4,495,247 A * | 1/1985 | Vasta | 428/422 |
| 4,613,653 A | 9/1986 | Kitchens et al. | |
| 4,775,449 A | 10/1988 | Dumas et al. | |

(Continued)

FOREIGN PATENT DOCUMENTS

JP    01-225674 A    8/1989

(Continued)

OTHER PUBLICATIONS

*Appl. Phys. Lett.*, vol. 54, No. 1, Jan. 2, 1989, ©1988 American Institute of Physics, "Ablation of Polytetrafluoroethylene (Teflon) with Femtosecond UV Excimer Laser Pulses", S. Küper and M. Stuke, p. 4-6.

(Continued)

*Primary Examiner*—Ramsey Zacharia
(74) *Attorney, Agent, or Firm*—Brian E. Szymanski

(57) ABSTRACT

A multi-layer structure includes a fluoropolymer bonded to a substrate. The structure is prepared by exposing a bonding composition to actinic radiation, such as ultraviolet radiation, to form the bond. The bonding composition includes a light-absorbing compound and an electron donor. The bonding composition includes non-adhesive materials.

11 Claims, 1 Drawing Sheet

U.S. PATENT DOCUMENTS

| | | | |
|---|---|---|---|
| 4,824,692 A | | 4/1989 | Gillick et al. |
| 4,912,171 A | | 3/1990 | Grootaert et al. |
| 5,051,312 A | | 9/1991 | Allmer |
| 5,086,123 A | | 2/1992 | Guenthner et al. |
| 5,141,969 A | * | 8/1992 | Saeva et al. .................. 522/31 |
| 5,262,490 A | | 11/1993 | Kolb et al. |
| 5,284,611 A | | 2/1994 | Grootaert et al. |
| 5,285,002 A | | 2/1994 | Grootaert |
| 5,320,789 A | | 6/1994 | Nishii et al. |
| 5,419,968 A | | 5/1995 | Okada et al. |
| 5,470,617 A | | 11/1995 | Nishii et al. |
| 5,478,652 A | | 12/1995 | Grootaert et al. |
| 5,562,991 A | * | 10/1996 | Tannenbaum ............... 428/421 |
| 5,580,616 A | | 12/1996 | Niino et al. |
| 5,656,121 A | | 8/1997 | Fukushi |
| 5,658,671 A | | 8/1997 | Fukushi |
| 5,684,065 A | | 11/1997 | Hiraoka et al. |
| 5,734,085 A | | 3/1998 | Coggio et al. |
| 5,859,086 A | | 1/1999 | Freund et al. |
| 5,869,157 A | * | 2/1999 | Stoeppelmann .......... 428/36.91 |
| 5,908,704 A | * | 6/1999 | Friedman et al. ........... 428/426 |
| 6,057,014 A | | 5/2000 | Fuller |
| 6,117,497 A | | 9/2000 | Murahara et al. |
| 6,255,384 B1 | | 7/2001 | McCarthy et al. |
| 6,451,925 B2 | * | 9/2002 | Jing ........................... 525/340 |
| 6,752,894 B2 | * | 6/2004 | Jing et al. ................. 156/272.2 |
| 2002/0197481 A1 | | 12/2002 | Jing et al. |

FOREIGN PATENT DOCUMENTS

| | | |
|---|---|---|
| JP | 01-225675 A | 9/1989 |
| JP | 06-279590 | 10/1994 |
| JP | 07-179628 | 7/1995 |
| JP | 07-179636 | 7/1995 |
| JP | 09-193164 | 7/1997 |
| JP | 2000-256488 | 9/2000 |
| JP | 2000-351809 | 12/2000 |
| WO | WO 96/05965 A1 | 2/1996 |
| WO | WO 00/52084 | 9/2000 |

OTHER PUBLICATIONS

*Appl. Phys. Lett.*, vol. 63, No. 25, Dec. 20, 1993, "Surface Modification and Metallization of Fluorocarbon Polymers by Excimer Laser Processing", H. Niino and A. Yabe.

Chemistry Letters, pp. 1637-1638, 1993; ©The Chemical Society of Japan, "Endowment With the Wettability On The Surface Of Tetrafluoroethylene-Perfluoroalkyl Vinyl Ether Copolymer By Excimer Laser Irradiation"; Atsushi Okada, Yasuo Negishi, Yuichi Shimizu, Shun'ichi Sugimoto, Masanobu Nishii, and Shunichi Kawananishi.

Elsevier, *Applied Surface Science 109/110* (1997) p. 222-226, "Excimer Laser Induced Surface Chemical Modification of Polytetrafluoroethylene", K. Révész, B. Hopp, Z. bor.

Dahm, R., in: "Surface Analysis and Pretreatment of Plastics and Metals", Applied Science Publishers, New York, 1982, p. 1-11.

Siperko, L.M.; Thomas, R.R.; *Journal Adhesion Sci. Technol.* 1989, vol. 3, p. 157.

Rye, R.R.; Arnold, G.W.; *Langmuir*, 1989, vol. 5, p. 1331.

Clark, D.T.; Hutton, D.R.; *Journal Polym. Sci., Polym. Chem. Ed.*, 1987, vol. 25, p. 2643.

Yao, T.; Musha, S.; Munemori, M.; *Chem. Lett.*, 1974, p. 939.

Allmer, K.; Feiring, A.E.; *Macromolecules*, 1991, vol. 24, p. 5487.

Costello, C.A.; McCarthy, T.J.; *Macromolecules*, 1984, vol. 17, p. 2941.

Iqbal, Z.; Ivory, D.M.; Szobota, J.S.; Elsenbaumer, r.L; Baughman, R.H.; *Macromolecules*, 1986, vol. 19, p. 2992.

MacNicol, D.D.; Robertson, C.D.; *Nature*, 1988, 332, 59.

Cooper, D.L.; Allan, N.L; Powell, R.L; *Journal Fluorine Chem.*, 1990, vol. 49, p. 421.

Marsella, J.A.; Gilicinski, A.G.; Goughlin, A.M.; Pez, G.P.; *Journal Organic Chem.*, 1992, vol. 57, p. 2856.

Burdeniuc, J.; Chupka, W.; Crabtree, R.H.; *Journal Am. Chem. Soc.*, 1995, 117, 10119.

Burdeniuc, J.; Crabtree,R.H.; *Science*, 1996, 271, 340.

Kaprinindis, N.A.; Turro, N.J.; *Tetrahedron Lett.*, 1996, 37, 2373.

Plueddemann, E.P.; *Silane Coupling Agents*, 1982, Plenum Press, NY, pp. 188-205.

Plueddemann, E.P.; *Silane Coupling Agents*, Second Edition, 1991, Plenum Press, NY, pp. 101-113.

*Chemlok® 607*, "Silicone Rubber & Specialty Elastomer Adhesive", Lord Corporation.

*Semiconductor International*, 11, Burggraf, Pieter, No. 8, vol. 5, (1988).

U.S. Appl. No. 09/862,125, filed May 21, 2001, now allowed.

Weismann, S.I.; *Journal Phys. Chem.*, 1954, vol. 22, p. 1135.

Kiplinger, J.L.; Richmond,T.G.; Osterberg,C.E.; *Chem. Rev.*, 1994, vol. 94, p. 341.

* cited by examiner

FLUOROPOLYMER BONDING COMPOSITION AND METHOD

CROSS REFERENCE TO RELATED APPLICATION

This application is a divisional of U.S. Ser. No. 09/862,022, filed May 21, 2001, now U.S. Pat. No. 6,630,047, the disclosure of which is herein incorporated by reference.

TECHNICAL FIELD

This invention relates to methods and compositions for bonding a fluoropolymer to a substrate.

BACKGROUND

Fluorine-containing polymers (also known as "fluoropolymers") are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one of the layers is a fluoropolymer, in part, because of the non-adhesive qualities of fluoropolymers. Various methods have been proposed to address this problem. One approach is to use an adhesive layer or tie layer between the fluoropolymer layer and the second polymer layer. Surface treatments for the fluoropolymer layer, including the use of powerful reducing agents (e.g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself.

SUMMARY

A multi-layer structure includes a fluoropolymer bonded to a substrate. The structure is prepared by exposing a bonding composition to actinic radiation, such as ultraviolet radiation, with optional heating, pressure, or combination thereof, to form the bond. The bonding composition includes a light-absorbing compound and an electron donor. The bonding composition may be free of adhesive materials.

In one aspect, a method of bonding a fluoropolymer to a substrate includes providing a bonding composition between a fluoropolymer and a substrate, and exposing the bonding composition to actinic radiation.

In another aspect, a method of bonding a fluoropolymer to a substrate includes providing a first substrate including a bonding composition, contacting the treated surface of the first substrate with a surface of a second substrate, and exposing the bonding composition to actinic radiation. The method may include applying heat, pressure, or a combination thereof, to form the bond. Each of the first substrate and the second substrate, independently, includes a matrix material. The matrix material can be a metal, a glass, an organic-inorganic composite, a fluoropolymer, and a non-fluorinated polymer with the proviso that at least one of the first substrate and the second substrate is a fluoropolymer.

The bonding composition may be provided between the fluoropolymer and the substrate in different ways. For example, a surface of the fluoropolymer may be treated with the bonding composition and the treated surface of the fluoropolymer may be contacted with a surface of the substrate, or a surface of the substrate may be treated with the bonding composition and the treated surface of the substrate may be contacted with a surface of the fluoropolymer. In certain embodiments, a mixture of the fluoropolymer and the bonding composition may be extruded and a surface of the extruded mixture may be contacted with a surface of the substrate. In other embodiments, the substrate or the fluoropolymer may be cast from solution or polymerized from a monomer. The bonding composition may be exposed to actinic radiation before contacting.

In another aspect, a composite article includes a fluoropolymer having a surface, a substrate having a surface, and a bonding composition interposed between the surface of the fluoropolymer and the surface of the substrate.

In yet another aspect, a treated fluoropolymer substrate suitable for bonding to a polymeric substrate includes a surface exposed to a combination of a light-absorbing compound and an electron donor and actinic radiation.

In still another aspect, a laminated article including a fluoropolymer is bonded to a substrate by a bonding composition including a light-absorbing compound and an electron donor exposed to actinic radiation.

In another aspect, a composition includes a fluoroalkylamine, such as a 2,2,2-trifluoroethylamine.

The bonding composition includes a light-absorbing compound and an electron donor. The light-absorbing compound may be an ammonium compound, a phosphonium compound, a sulfonium compound, a sulfoxonium compound, an iodonium compound, an arsonium compound, or combinations thereof. The ammonium compound or phosphonium compound may include a benzyl moiety. The electron donor may be an amine, a phosphine, a thioether, or combinations thereof. The amine may be a primary amine, an amino-substituted organosilane, or combinations thereof. The amine may be a mono-, di- or tri-alkylamine. The alkylamine can be a fluoroalkylamine. The amino-substituted organosilane may have a hydrolyzable substituent. The bonding composition may include a vinylsilane. The bonding composition may be exposed to actinic radiation through the fluoropolymer or the substrate.

The fluoropolymer may be a perfluorinated polymer or a partially fluorinated polymer. The substrate may include an inorganic substrate, such as a metal and a glass, or an organic substrate, such as a non-fluorinated polymer or fluoropolymer, or an organic-inorganic composite.

Bonded multi-layer materials may have combined physical and chemical properties possessed by both fluoropolymers and non-fluorinated polymers, resulting in less expensive, well-performing articles. For example, the fluoropolymer component may be used in automotive hose and container constructions, anti-soiling films, low energy surface PSA tapes and coatings for aircraft. The bonding process is a mild photochemical lamination that may promote adhesion between a fluoropolymer and a substrate. The bonding composition may be used to form a composite article having a fluoropolymer cladding on a conductive and lustrous metal to protect it from corrosion, a fluoropolymer cladding on glass fibers to enhance their physical strength and chemical resistance for telecommunication, or a fluoropolymer layer bonded to a hydrocarbon substrate in a multi-layer materials.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
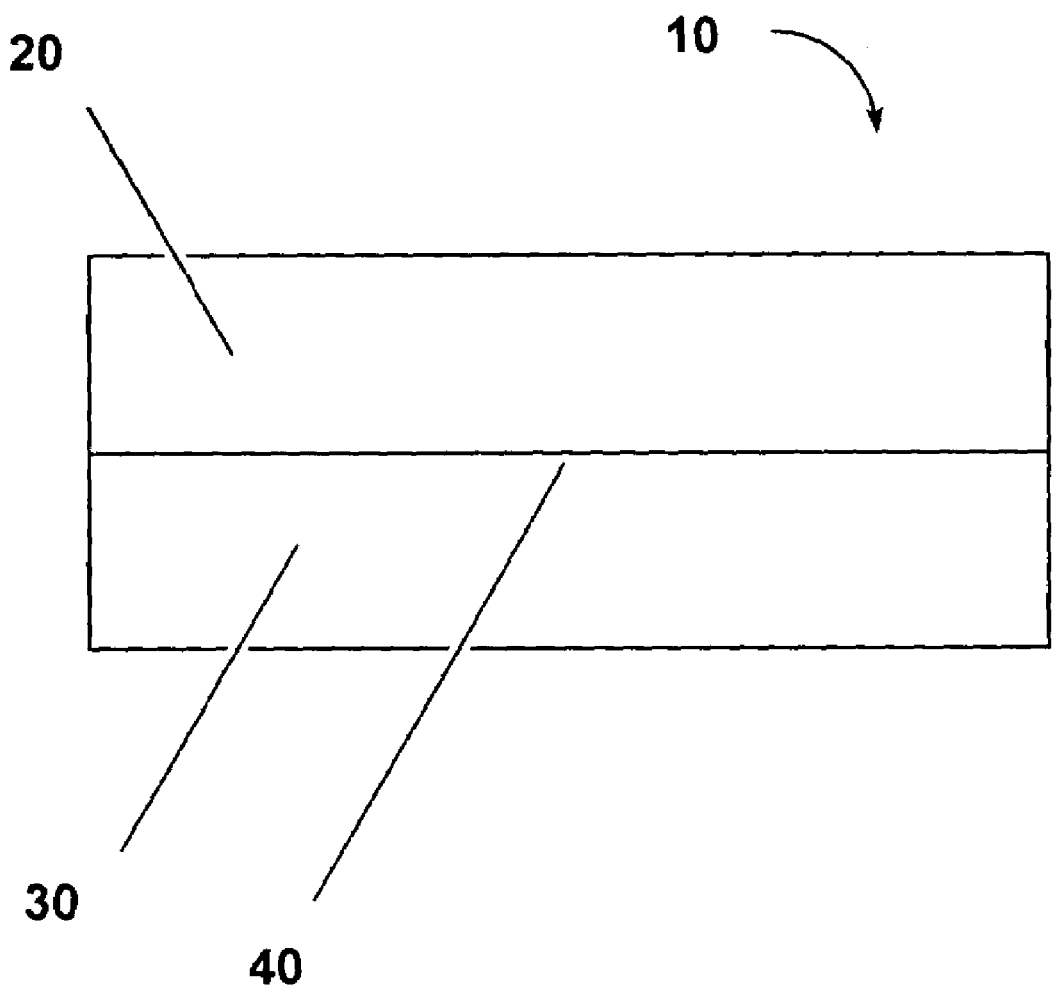
FIG. 1 is a cross-sectional view of a multi-layer article.

A fluoropolymer layer may be bonded on one surface of a substrate to form, for example, a laminate. The laminate may contain two or more layers. Referring to FIG. 1, the laminate 10 includes fluoropolymer layer 20 and the substrate 30. Bonding composition 40 contacts the interface between fluoropolymer layer 20 and substrate 30. Actinic radiation applied to the bonding composition promotes bonding between fluoropolymer layer 20 and substrate 30.

The bonding composition includes a light-absorbing compound and an electron donor. The bonding composition may include a solvent to facilitate applying a coating of the composition to a surface of the fluoropolymers or the substrate, or both. The solvent may be removed, for example, by drying, prior to contacting the substrate and fluoropolymers surfaces. Any solvent, if used may be a fluorinated solvent, for example, a fluorinated solvent having at least one fluorinated moiety. Fluorinated solvents may be effective at promoting wetting of the bonding composition onto either substrate. Preferred fluorinated solvents include, for example, hexafluoroxylene, hexafluorobenzene, and the like.

Actinic radiation is electromagnetic radiation having a wavelength capable of affecting bonding between the fluoropolymer and the substrate in the presence of the bonding composition. The actinic radiation has an intensity at a wavelength capable of affecting bonding within a reasonable amount of time. The actinic radiation may have a wavelength between 190 nm and 700 nm, preferably between 200 nm and 400 nm, more preferably between 205 nm and 320 nm, even more preferably between 210 nm and 290 nm, and even more preferably between 240 nm and 260 nm.

The actinic radiation has a wavelength that is absorbed by the light-absorbing compound. The light-absorbing compound may have an absorbing moiety capable of being excited by the actinic radiation, such as, for example, a benzyl moiety or other aromatic moiety. The light-absorbing compound may be an ammonium compound, a phosphine, a phosphonium compound, an aromatic hydrocarbon compound, a thioether compound, an ether compound, a phenolic compound, a sulfonium compound, a sulfoxonium compound, an iodonium compound, an arsonium compound, or combinations thereof. Specific examples include triphenylphosphine, benzyltriphenylphosphonium chloride, benzyltributylammonium chloride, an arylammonium salt, tetraphenylarsonium chloride, diphenyl sulfide, biphenyl, 4,4'-dihydroxybiphenyl and triarylsulfonium chloride. Other examples of light-absorbing compounds are described, e.g., in Fukushi, U.S. Pat. No. 5,658,671, "Fluoroelastomer Coating Composition," hereby incorporated by reference. The light-absorbing compound may have a molar absorptivity of at least 100, preferably at least 500, more preferably at least 1,500, even more preferably at least 5,000 at a wavelength when exposed to actinic radiation. In some embodiments, the light-absorbing compound may include individual components that do not significantly absorb actinic radiation in a purified state, but absorbs light when the components are combined. For example, a component of the composite may form a charge-transfer complex with the donor, fluoropolymer, substrate or other added ingredient, resulting in a compound that absorbs actinic radiation.

The electron donor is a compound capable of reducing the excited state of the light-absorbing compound. For example, the electron donor may be an amine, a phosphine, a thiol, a thioether, phenol, thiophenol, phenolate, thiophenolate or combinations thereof. The amine may be a primary amine, such as an alkylamine, e.g., a monoalkylamine, a dialkylamine, or a trialkylamine, such as a fluoroalkylamine. The electron donor may be polymerizable, for example, a polymerizable amine such as an aminoalkene or a vinylaniline. The amine may be an amino-substituted organosilane. The amino-substituted organosilane may have a hydrolyzable substituent; for example, it may be a trialkoxysilane. For example, the amino-substituted organosilane may have the formula

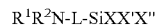

where each of $R^1$ and $R^2$, independently, is H, C1–12 alkyl, C1–12 alkenyl, C1–12 alkynyl, or aryl, and L is a divalent straight chain C1–12 alkylene, C3–8 cycloalkylene, 3–8 membered ring heterocycloalkylene, C1–12 alkenylene, C3–8 cycloalkenylene, 3–8 membered ring heterocycloalkenylene, arylene, or heteroarylene. L is optionally substituted with C1–4 alkyl, C2–4 alkenyl, C2–4 alkynyl, C1–4 alkoxy, hydroxyl, halo, carboxyl, amino, nitro, cyano, C3–6 cycloalkyl, 3–6 membered heterocycloalkyl, aryl, 5–6 membered ring heteroaryl, C1–4 alkylcarbonyloxy, C1–4 alkyloxycarbonyl, C1–4 alkylcarbonyl, formyl, C1–4 alkylcarbonylamino, or C1–4 aminocarbonyl. L is further optionally interrupted by —O—, —S—, —N(Rc)-, —N(Rc)-C(O)—, —N(Rc)-C(O)—O—, —O—C(O)—N(Rc)-, —N(Rc)-C(O)—N(Rd)-, —O—C(O)—, —C(O)—O—, or —O—C(O)—O—. Each of Rc and Rd, independently, is hydrogen, alkyl, alkenyl, alkynyl, alkoxy, hydroxylalkyl, hydroxyl, or haloalkyl. Each of X, X' and X" is a C1–18 alkyl, halogen, C1–8 alkoxy, C1–8 alkylcarbonyloxy, or amino group. When the amino-substituted organosilane has a hydrolyzable substituent, at least one of X, X' and X" is not alkyl. Further, any two of X, X' and X" may be joined through a covalent bond. The amino group may be an alkylamino group.

The bonding composition may include other additives, for example, a vinylsilane, such as an alkoxyvinylsilane, polyhydroxy aromatic compounds, or a thermosetting resin such as an epoxy resin, a urethane resin, a urea resin, or an acrylate resin.

The fluoropolymer may be a perfluorinated polymer or a partially fluorinated polymer. For example, the fluoropolymer may be either melt-processable such as in the case of a terpolymer of tetrafluoroethylene, hexafluoropropylene and vinylidene fluoride (THV™), a tetrafluoroethylene-hexafluoropropene copolymer (FEP), and other melt-processible fluoroplastics, or may be non-melt processable such as in the case of polytetrafluoroethylene (PTFE), modified PTFE copolymers, such as a copolymer of TFE and low levels of fluorinated vinyl ethers and fluoroelastomers. Fluoroelastomers may be processed before they are cured by injection or compression molding or other methods normally associated with thermoplastics. Fluoroelastomers after curing or crosslinking may not be not able to be further processed. Fluoroelastomers may also be coated out of solvent in their uncross linked form. Fluoropolymers may also be coated from an aqueous dispersion form. In preferred embodiments, the fluoropolymer may be FEP, a tetrafluoroethylene-perfluoropropyl vinyl ether copolymer (PFA), perfluoroelastomer, or mixtures thereof.

Preferably, the fluoropolymer is a material that is capable of being extruded or solvent coated. Such fluoropolymers typically are fluoroplastics that have melting temperatures ranging from about 100 to about 330° C., more preferably from about 150 to about 270° C. Preferred fluoroplastics include interpolymerized units derived from VDF and fluoroethylene and may further include interpolymerized units derived from other fluorine-containing monomers, non-fluorine-containing monomers, or a combination thereof.

Examples of suitable fluorine-containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), and fluorine-containing di-olefins such as perfluorodiallyl ether and perfluoro-1,3-butadiene. Examples of suitable non-fluorine-containing monomers include olefin monomers such as ethylene, propylene, and the like.

The VDF-containing fluoropolymer may be prepared using emulsion polymerization techniques as described, e.g., in Sulzbach et al., U.S. Pat. No. 4,338,237 or Grootaert, U.S. Pat. No. 5,285,002, hereby incorporated by reference. Useful commercially available VDF-containing fluoroplastics include, for example, Dyneon™ THV™ 200, THV™ 400, THV™ 500G, THV™ 610X fluoropolymers (available from Dyneon LLC, St. Paul, Minn.), KYNAR™ 740 fluoropolymer (available from Atochem North America, Philadelphia, Pa.), HYLAR™ 700 (available from Ausimont USA, Inc., Morristown, N.J.), and FLUOREL™ FC-2178 (available from Dyneon, LLC).

A particularly useful fluoropolymer includes interpolymerized units derived from at least TFE and VDF in which the amount of VDF is at least 0.1% by weight, but less than 20% by weight. Preferably, the amount of VDF ranges from 3–15% by weight, more preferably from 10–15% by weight.

Examples of suitable fluoroelastomers include VDF-HFP copolymers, VDF-HFP-TFE terpolymers, TFE-propylene copolymers, and the like.

The substrate may include an inorganic substrate, such as a metal or an inorganic glass, or an organic substrate, such as a fluoropolymer or a non-fluorinated polymer. Alternatively, the substrate may be an organic-inorganic composite. The metal may be copper or stainless steel. The inorganic glass may be a silicate. The non-fluorinated polymer may be a polyamide, a polyolefin, a polyurethane, a polyester, a polyimide, a polyimide, a polystyrene, a polycarbonate, a polyketone, a polyurea, a polyacrylate, and a polymethylmethacrylate, or a mixture thereof. For example, the non-fluorinated polymer may be a non-fluorinated elastomer, such as acrylonitrile butadiene (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX™ available from E. I DuPont de Nemours Co., Wilmington, Del.

Polyamides useful as the non-fluorinated polymer are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 may be used, as well as ring-containing polyamides such as nylon-6,T and nylon-6,1. Suitable nylons include VESTAMID™ L2140, a nylon-12 available from Creanova, Inc. of Somerset, N.J. Polyether-containing polyamides, such as PEBAX™ polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexandiol may also be used in the reaction. Useful commercially available urethane polymers include MORTHANE™ L424.167 (MI=9.7), PN-04 or 3429 from Morton International, Seabrook, N.H. and X-4107 from B. F. Goodrich Co., Cleveland, Ohio.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high density polyethylene or may be an elastomeric copolymer of ethylene and propylene. Carboxyl, anhydride, or imide functionalities may be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available, for example, as ENGAGE™ (Dow-DuPont Elastomers, Wilmington, Del.) or EXACT™ (ExxonMobil, Linden, N.J.). For example, anhydride modified polyethylene polymers are commercially available from E. I. DuPont de Nemours & Co., Wilmington, Del., under the trade designation BYNEL™ co-extrudable adhesive resins.

Useful polyacrylates and polymethacrylates include polymers of acrylic acid, methyl acrylate, ethyl acrylate, acrylamide, methacrylic acid, methyl methacrylate, ethyl methacrylate, and the like. An example of a polymethacrylate is EMAC™ (Chevron Chemical Co., Houston, Tex.).

Useful polycarbonate polymers include aliphatic polycarbonates such as polyester carbonates, polyether carbonates, and bisphenol A-derived polycarbonates, and the like.

Useful polyimide polymers include polyimide polymers made from the anhydride of pyromellitic acid and 4,4'-diaminodiphenyl ether available from E. I. DuPont de Nemours and Company under the tradename KAPTON™. Variations include KAPTON™ H, KAPTON™ E and KAPTON™ V, among others.

Additional examples of useful non-fluorinated polymers, as noted above, include polyesters, polycarbonates, polyketones, and polyureas. Commercially available examples of such polymers include SELAR™ polyester (E. I. DuPont de Nemours & Co., Wilmington, Del.), LEXAN™ polycarbonate (General Electric, Pittsfield, Mass.), KADEL™ polyketone (Amoco, Chicago, Ill.), and SPECTRIM™ polyurea (Dow Chemical Co., Midland, Mich.).

Commercially available elastomers include NIPOL™ 1052 NBR (Zeon Chemical, Louisville, Ky.), HYDRIN™ C2000 epichlorohydrin-ethylene oxide rubber (Zeon Chemical, Louisville, Ky.), HYPALON™ 48 chlorosulfonated polyethylene rubber (E. I. DuPont de Nemours & Co., Wilmington, Del.), NORDEL™ EPDM (R. T. Vanderbilt Co., Inc., Norwalk, Conn.), VAMAC™ ethylene-acrylate elastomer (E. I. DuPont de Nemours & Co. Wilmington, Del.), KRYNAC™ NBR (Bayer Corp., Pittsburgh, Pa.), PERBUNAN™ NBR/PVC blend (Bayer Corp., Pittsburgh, Pa.), THERBAN™ hydrogenated NBR (Bayer Corp., Pittsburgh, Pa.), ZETPOL™ hydrogenated NBR (Zeon Chemical, Louisville, Ky.), SANTOPRENE™ thermoplastic elastomer (Advanced Elastomer Systems, Akron, Ohio), and KELTAN™ EPDM (DSM Elastomers Americas, Addis, La.).

The substrate may include a second fluoropolymer.

The substrate may have one or more surface polar functionality present thereon to enhance bonding, such as, for example, an amino, carboxyl and hydroxyl functionality.

The bonding composition may be deposited on a surface of the fluoropolymer, the substrate or both. In certain embodiments, the bonding composition may be incorporated into the fluoropolymer, the substrate, or both, such that when the surfaces contact each other, the bonding composition contacts the fluoropolymer and the substrate simultaneously. The bonding composition may be incorporated into the fluoropolymer or the substrate by melt mixing or extruding a mixture including the bonding composition. Alternatively, the bonding composition may be applied to a surface of the fluoropolymer or substrate by a process such as, for example, spray coating, curtain coating, immersion coating, dip coating, flood coating, and the like.

The fluoropolymer and substrate may contact each other under pressure, with optional heating, to form a precursor that is subsequently exposed to actinic radiation. In certain situations, more than one fluoropolymer layer may contact more than one surface of the substrate. In still other situations, two substrates may contact two surfaces of a fluoropolymer.

Each of the fluoropolymer and the substrate, independently, may be provided as a film or as a molded or shaped article. Preferably either the fluoropolymer or the substrate is substantially transmissive to the actinic radiation.

The fluoropolymer is bonded to the substrate by exposing the bonding composition to actinic radiation. The bonding composition may be exposed to actinic radiation through the fluoropolymer, through the substrate, or both. In certain situations, the exposure to actinic radiation may be before the substrate contacts the fluoropolymer. In other situations, the exposure to actinic radiation may occur after the substrate and fluoropolymer contact each other. In still other situations, exposure to actinic radiation occurs simultaneously upon contacting the substrate and the fluoropolymer.

Suitable sources of actinic radiation include arc lamps, such as xenon-arc lamps, mercury arc lamps (including low and medium pressure mercury arc lamps), fluorescent blacklights, microwave-driven lamps, such as those sold by Fusion UV Systems of Rockville, Md. (including H-type and D-type bulbs), lasers and the like. Lamps that emit enriched amounts of ultraviolet or blue light, such as, for example, low pressure mercury (e.g., germicidal) lamps, are preferred.

In many cases, heat, pressure, or combinations thereof, may be desired during bonding. Suitable heat sources include, but are not limited to, ovens, heated rollers, heated presses, infrared radiation sources, flame, and the like. Suitable pressure sources are well known and include presses, nip rollers, and the like.

The invention will now be described further by way of the following examples.

EXAMPLES

In the following examples, the term "wt %" means weight percent based on total weight.

"THV™ 500" refers to a terpolymer of TFE/HFP/VDF, having a melt temperature of 165° C.; "THV™ 400" refers to a terpolymer of TFE/HFP/VDF, having a melt temperature of 150° C.; "THV™ 200" refers to a terpolymer of TFE/HFP/VDF, having a melt temperature of 120° C.; "FEP" refers to FEP X6307 which is a copolymer of tetrafluorethylene and hexafluoropropylene, 85/15 by weight; "HTE" is a terpolymer of hexafluoropropylene, teterafluoroethylene and ethylene, all available from Dyneon, L.L.C. of Oakdale, Minn.

"PVDF-HV" refers to "PVDF 11010" which is a tradename for a copolymer of hexafluoropropylene and vinylidene fluoride having a melting point of 160° C.; "PVDF-CV" refers to SOLEF™ PVDF-CV which is a copolymer of chlorotrifluoroethylene and vinylidene fluoride, both commercially available from Soltex Polymer Corp. of Houston, Tex.

"BYNEL™ 3101" is an acid modified ethylene-vinyl acetate copolymer; "ELVAX™ 450" is an ethylene-vinyl acetate copolymer having 18 wt % vinyl acetate and a Vicat softening temperature of 61° C.; "polyimide" refers to Kapton™ 100HN film, all commercially available from E. I. du Pont de Nemours of Wilmington Del.

"EMAC™ 2202T" is a copolymer of ethylene and methyl acrylate, 80/20 by weight available from Chevron Chemical Co. of Houston, Tex.

"MORTHANE™ L424.167 (MI=9.7)" is an aliphatic polyurethane available from Morton, International of Chicago, Ill.

"VESTAMID™ L2140" refers to nylon 12 having a Vicat softening point of 140° C. commercially available from Creanova, Inc. of Somerset, N.J.

"Copper-coated polyimide" refers to Kapton™ 100HN film that has been metallized with copper. "Gold-coated polyimide" refers to Kapton™ 100 HN film that has been metallized with gold.

"Polycarbonate film" refers to polyethylene terephthalate film of about 10 mils (0.25 mm) thickness.

Unless otherwise specified, additional materials used in the examples were readily available from general commercial vendors such Sigma-Aldrich Chemical Co. of Milwaukee, Wis.

Example 1

Polymer films (i.e., substrates) were prepared by placing polymer granules indicated in Tables 1A and 1B were placed between two sheets of polytetrafluoroethylene having a thickness of 0.38 mm and softening them for 2–3 minutes at 200° C. Subsequently, the softened materials were pressed for about 5 to 10 seconds between two heated platens of a Wabash hydraulic press (Wabash Metal Products Company, Inc., Hydraulic Division, Wabash, Ind.) and immediately transferred to a cold Wabash hydraulic press at 13–15° C. and 2–4 psi (0.014–0.028 MPas). After cooling to room temperature in the cold press, round-shaped films of polymer having a thickness of 1.5 mm were obtained. Small pieces of the pressed films were then placed between two stainless steel plates lined with polyethylene terephthalate-silicone coated release liners and pressed for 2–3 minutes at 200° C. with pressure and applied between two heated platens of a Wabash hydraulic press. The films produced in this manner were thin smooth films of 0.08 to 0.15 mm in thickness. The substrate films thus prepared were cut to dimensions of approximately 2.5 cm by 5 cm for use in lamination.

Two bonding compositions were prepared. Bonding composition (BC 1) was prepared by mixing 0.2 g allylamine and 0.1 g benzyltriphenylphosphonium chloride in 2 g methanol. A second bonding composition (BC 2) was prepared by mixing 0.2 g allylamine and 0.1 g triphenylphosphine in 2 g methanol. All the above chemicals were available from Sigma-Aldrich Chemical Co., Milwaukee, Wis.

The cut film was flood-coated with the bonding composition. It was not necessary to dry the bonding composition before forming the bond. Samples were prepared by contacting a fluoropolymer film surface with the bonding composition-coated substrate surface to form a laminate precursor. Comparative samples were prepared by omitting the bonding composition. The laminate precursor was then placed vertically in the center of a 254 nm photoreactor (Rayonet chamber reactor, model RPR-100 equipped with sixteen low pressure mercury bulbs available from The Southern New England Ultraviolet, Inc. of New Haven, Conn. These samples were irradiated for periods of time indicated in Tables 1A and 1B.

After irradiation samples were subjected to hot lamination onto thicker films (1–1.5 mm) of their respective materials for 2 minutes at 200° C. in order to obtain accurate adhesion measurement because the irradiated samples were too thin and film stretching/rupturing would be expected during the measurement.

Peel strength was used to determine the degree of bonding. Peel strength was determined in accordance with ASTM D-1876 (T-peel test). An Instron™ model 1125 tester, available from Instron Corp., Canton, Mass. set at a 4 inch (10.2 cm) per minute crosshead speed was used as the test device. The peel strength was calculated as the average load measured during the peel test. The measured peel strength is shown in Tables 1A and 1B. Comparative experiments showed that no adhesion between substrates and fluoropolymer films was observed prior to irradiation with the bonding composition present.

Example 2

Glass microscope slides and stainless steel panels (1 inch (2.54 cm) by 2 inch (5.08 cm) pieces were cleaned with acetone. A surface of the glass or steel substrate was coated with a bonding composition, and a piece of fluoropolymer film was subsequently laminated onto the coated substrate in a good surface contact. A strip of silicone liner was inserted along the short edge between the substrate surface and the fluoropolymer film to provide tabs for the peel test. The laminated sample was positioned vertically in the center of a 254 nm photoreactor as described in Example 1 and irradiated for a period of time as shown in Tables 1A and 1B. The measured peel strength is shown in Tables 1A and 1B.

Example 3

Instead of fluoropolymer film, a solution of 25% fluoroelastomer FLUOREL™ FC2145, a raw gum dipolymer of VDF and HFP, (available from Dyneon, LLC) in methanol was coated onto the side of a glass slide having the bonding composition. The fluoroelastomer-coated glass was then subjected to irradiation at 254 nm in a photoreactor as described in Example 1 for a period of time as shown in Tables 1A and 1 B. Adhesion between the fluoroelastomer and glass was found.

TABLE 1A

| Laminate | Comparative Adhesion (N/cm) | BC 1 | | BC 2 | | BC 3 | |
|---|---|---|---|---|---|---|---|
| | | Irrad. time (min) | Adhesion (N/cm) | Irrad. time (min) | Adhesion (N/cm) | Irrad. Time (min) | Adhesion (N/cm) |
| ELVAX ™ 450/THV ™ 400 | 0 | 10 | 18.9 | 10 | 25.3 | 20 | 4.9 |
| ELVAX ™ 450/THV ™ 400 | 0 | | | 5 | 19.0 | | |
| ELVAX ™ 450/THV ™ 200 | 0 | 45 | 15 | | | | |

TABLE 1A-continued

|  |  | BC 1 | | BC 2 | | BC 3 | |
|---|---|---|---|---|---|---|---|
| Laminate | Comparative Adhesion (N/cm) | Irrad. time (min) | Adhesion (N/cm) | Irrad. time (min) | Adhesion (N/cm) | Irrad. Time (min) | Adhesion (N/cm) |
| ELVAX ™ 450/THV ™ 500 | 0 | 45 | 14.4 | | | | |
| BYNEL ™ 3101/THV ™ 400 | 0 | 10 | 14 | 10 | 13 | | |
| BYNEL ™ 3101/THV ™ 500 | 0 | | | 5 | 14.4 | | |
| BYNEL ™ 3101/THV ™ 200 | 0 | 45 | 17 | | | | |
| EMAC ™ 2220/THV ™ 400 | 0 | 10 | 17 | 10 | 25.2 | | |
| EMAC ™ 2220/THV ™ 400 | 0 | | | 15 | 6.7 | | |
| EMAC ™ 2220/THV ™ 400 | 0 | | | 5 | 19.8 | | |
| EMAC ™ 2220/THV ™ 200 | 0 | 45 | 5.8 | | | | |
| EMAC ™ 2220/THV ™ 500 | 0 | 45 | 5.8 | | | | |
| VESTAMID ™ L2140/THV ™ 400 | 0 | 15 | 24.3 | 15 | 19.0 | | |
| MORTHANE ™ L424.167, MI = 9.7/THV ™ 400 | 0 | 15 | 8.8 | 15 | 20.4 | | |
| ENGAGE ™ 8402/THV ™ 400 | 0 | | | 20 | 5.1 | 20 | 0 |
| ENGAGE ™ 8402/PVDF | 0 | | | 20 | 33.1 | | |
| EXACT ™ 4015/PVDF | 0 | | | 20 | 10 | | |
| EXACT ™ 4015/THV ™ 400 | 0 | | | 20 | 4.4 | | |
| Polyester/THV400 | 0 | | | 30 | 3.2 | | |

TABLE 1B

|  |  | BC 1 | | BC 2 | |
|---|---|---|---|---|---|
| Laminate | Comparative Adhesion (N/cm) | Irrad. time (min) | Adhesion (N/cm) | Irrad. time (min) | Adhesion (N/cm) |
| ELVAX ™ 4501/PVDF | 0.4 | 15 | 24.7 | 15 | 18.6 |
| ELVAX ™ 4501/PVDF | 0.4 | | | 10 | 19.2 |
| ELVAX ™ 4501/PVDF | 0.4 | | | 5 | 2.8 |
| BYNEL ™ 3101/PVDF | 1 | 15 | 19.7 | 15 | 36.0 |
| BYNEL ™ 3101/PVDF | 1 | 15 | 6.7 | 10 | 26.6 |
| BYNEL ™ 3101/PVDF | 1 | | | 5 | 11 |
| EMAC ™ 2220/PVDF | 0 | 15 | 23.2 | 15 | 26.6 |
| EMAC ™ 2220/PVDF | 0 | | | 10 | 17.8 |
| EMAC ™ 2220/PVDF | 0 | | | 5 | 9.0 |
| ELVAX ™ 450/SOLEF ™ HV | 0 | | | 20 | 174 |
| BYNEL ™ 3101/SOLEF ™ HV | 0 | | | 20 | 28.0 |
| EMAC ™ 2220/SOLEF ™ HV | 0 | | | 20 | 25.4 |
| BYNEL ™ 3101/SOLEF ™ CV | 0 | | | 20 | 21.2 |
| EMAC ™ 2220/SOLEF ™ CV | 0 | | | 20 | 26.1 |
| Glass/THV ™ 400 | 0 | 45 | Good | 45 | Good |
| Steel/THV ™ 400 | 0 | 45 | Good | 45 | Good |
| Glass/Fluorel ™ FC-2145 | 0 | 45 | Good | | |

Example 4

The procedure of Example 1 was followed using the bonding composition (BC) and comparative compositions (COMP) listed in Tables 2A and 2B, except that cut fluoropolymer film was coated with the bonding composition or comparative compositions. Subsequently, a second fluoropolymer film was placed on the bonding composition to form a laminate precursor. The precursor was then placed vertically in the center of a 254 nm photoreactor (Rayonet chamber reactor, model RPR-100 equipped with sixteen low pressure mercury bulbs. Samples were irradiated for periods of time indicated in Tables 3 A–4. After irradiation, the two pieces of fluoropolymer films were peeled apart and individually laminated to bonding substrates to form the final multiplayer articles. A strip of a silicon liner was inserted about 0.6 cm into the space between the layers along the short edge for peel testing. The article was hot pressed at 200° C. for 2 minutes and immediately transferred to a cold Wabash hydraulic press 13–15° C. After cooling to room temperature in the cold press, the sample was ready for peel testing.

TABLE 2A

| Composition | Ingredients |
| --- | --- |
| BC4 | Diphenyliodonium chloride (0.02 g) + allylamine (0.2 g) + acetonitrile (2. g) |
| COMP4 (comparative) | Diphenyliodonium chloride saturated in acetonitrile (2.0 g) |
| BC5 | Tetraphenylarsonium chloride (0.03 g) + allylamine (0.2 g) + acetonitrile (2.0 g) |
| COMP5 (comparative) | Tetraphenylarsonium chloride (0.03 g) + acetonitrile (2.0 g) |
| BC6 | Tetraphenylarsonium chloride (0.05 g) + ethylenediamine (0.2 g) + acetonitrile (2.0 g) |
| COMP6 (comparative) | Tetraphenylarsonium chloride (0.05 g) + acetonitrile (2.0 g) |
| BC7 | Triphenylsulfonium chloride (0.05 g) + allylamine (0.2 g) + acetonitrile (2.0 g) |
| COMP7 (comparative) | Triphenylsulfonium chloride (0.05 g) + acetonitrile (2.0 g) |
| BC8 | Triphenylsulfonium chloride (0.05 g) + n-butylamine (0.2 g) + acetonitrile (2.0 g) |
| BC9 | Triphenylsulfonium chloride (0.05 g) + diallylamine (0.2 g) + acetonitrile (2.0 g) |
| BC10 | Phenyltrimethylammonium chloride(saturated) + allylamine (0.2 g) + acetonitrile (2.0 g) |
| COMP10 (comparative) | Phenyltrimethylammonium chloride(saturated) + acetonitrile (2.0 g) |
| BC11 | Tetraphenylphosphonium chloride (0.1 g) + allylamine (0.2 g) + acetonitrile (2.0 g) |
| COMP11 (comparative) | Tetraphenylphosphonium chloride (0.1 g) + acetonitrile (2.0 g) |
| BC12 | Tetrabutylphosphonium chloride (0.1 g) + allylamine (0.2 g) + acetonitrile (2.0 g) |
| COMP12 (comparative) | Tetrabutylphosphonium chloride (0.1 g) + acetonitrile (2.0 g) |
| BC13 | Diphenyl sulfide (0.1 g) + allylamine (0.2 g) in + acetonitrile (2.0 g) |
| COMP13 (comparative) | Diphenyl sulfide (0.1 g) + acetonitrile (2.0 g) |

TABLE 2B

| Composition | Ingredients |
| --- | --- |
| BC14 | Diphenyl sulfone (0.1 g) + allylamine (0.2 g) + acetonitrile (2.0 g) |
| COMP14 (comparative) | Diphenyl sulfone (0.1 g) + acetonitrile (2.0 g) |
| BC15 | Anisole (0.1 g) + allylamine (0.2 g) + acetonitrile (2.0 g) |
| COMP15 (comparative) | Anisole (0.1 g) + acetonitrile (2.0 g) |
| BC16 | Biphenyl (0.1 g) + allylamine (0.2 g) + acetonitrile (2.0) |
| COMP16 (comparative) | Biphenyl (0.1 g) + acetonitrile (2.0 g) |
| BC17 | 4,4'-dihydroxybiphenyl (0.1 g) + allylamine (0.2 g) + acetonitrile (2.0 g) |
| COMP17 (comparative) | 4,4'-dihydroxybiphenyl (0.1 g) + acetonitrile (2.0 g) |
| BC18 | Diphenyl ether (0.1 g) + allylamine (0.2 g) + acetonitrile (2.0 g) |
| COMP18 (comparative) | Diphenyl ether (0.1 g) + acetonitrile (2.0 g) |
| BC19 | Anisole (0.1 g) + aniline (0.2 g) + acetonitrile (2.0 g) |
| COMP19 (comparative) | Anisole (0.1 g) + acetonitrile (2.0 g) |
| BC20 | Chlorobenzene (0.1 g) + allylamine (0.2 g) + acetonitrile (2.0 g) |
| COMP20 (comparative) | Chlorobenzene (0.1 g) + acetonitrile (2.0 g) |

TABLE 2B-continued

| Composition | Ingredients |
| --- | --- |
| BC21 | Biphenyl (0.1 g) + n-butylamine (0.2 g) + acetonitrile (2.0 g) |
| COMP21 (comparative) | Biphenyl (0.1 g) + acetonitrile (2.0 g) |
| BC22 | Pyrene (0.1 g) + n-butylamine (0.2 g) + acetonitrile (2.0 g) |
| COMP22 (comparative) | Pyrene (0.1 g) + acetonitrile (2.0 g) |
| BC23 | Anisole (0.1 g) + 3-aminopropyltriethoxysilane (0.2 g) + acetonitrile (2.0 g) |
| COMP23 (comparative) | Anisole (0.1 g) + acetonitrile (2.0 g) |
| BC24 | Diphenyl sulfide (0.1 g) + 3-aminopropyltriethoxysilane (0.2g) + acetonitrile (2.0 g) |
| COMP24 (comparative) | Diphenyl sulfide (0.1 g) + acetonitrile (2.0 g) |
| BC25 | Anisole (0.1 g) + 3-aminopropyltriethoxysilane (0.2 g) + acetonitrile (2.0 g) |
| COMP25 (comparative) | Anisole (0.1 g) + acetonitrile (2.0 g) |
| BC26 | Anisole (0.1 g) + ethylenediamine (0.2 g) + acetonitrile (2.0 g) |
| BC27 | Anisole (0.1 g) + aminoethanol (0.2 g) + acetonitrile (2.0 g) |
| COMP27 (comparative) | Anisole (0.1 g) + acetonitrile (2.0 g) |
| BC28 | Tetraphenylarsonium chloride (0.05 g) + allylamine (0.2 g) + acetonitrile (2.0 g) |

TABLE 3A

| Sample | BC | Irradiation time at 254 nm (min) | Peel Strength (N/cm) |
| --- | --- | --- | --- |
| FEP/VESTAMID™ L2140 | BC4 | 10 | 15.84 |
| FEP/VESTAMID™ L2140 | COMP4 | 10 | 0 |
| FEP/VESTAMID™ L2140 | BC5 | 10 | 14.08 |
| FEP/BYNEL™ 3101 | BC5 | 10 | 21.12 |
| FEP/VESTAMID™ L2140 | COMP5 | 10 | 0 |
| FEP/BYNEL™ 3101 | COMP5 | 10 | 0 |
| FEP/VESTAMID™ L2140 | BC6 | 5 | 14.08 |
| FEP/BYNEL™ 3101 | BC6 | 5 | 8.8 |
| FEP/VESTAMID™ L2140 | COMP6 | 5 | 0 |
| FEP/BYNEL™ 3101 | COMP6 | 5 | 0 |
| FEP/VESTAMID™ L2140 | BC7 | 5 | cohesive FEP failure |
| FEP/BYNEL™ 3101 | BC7 | 5 | 5.28 |
| FEP/VESTAMID™ L2140 | COMP7 | 5 | 0 |
| FEP/BYNEL™ 3101 | COMP7 | 5 | 0 |
| FEP/VESTAMID™ L2140 | BC8 | 10 | 8.8 |
| FEP/BYNEL™ 3101 | BC8 | 10 | 11.44 |
| FEP/VESTAMID™ L2140 | BC9 | 10 | cohesive FEP failure |
| FEP/BYNEL™ 3101 | BC9 | 10 | cohesive FEP failure |
| FEP/VESTAMID™ L2140 | BC10 | 15 | cohesive FEP failure |
| FEP/BYNEL™ 3101 | BC10 | 15 | 10.56 |
| FEP/VESTAMID™ L2140 | COMP10 | 15 | 0 |
| FEP/BYNEL™ 3101 | COMP10 | 15 | 0 |
| FEP/VESTAMID™ L2140 | BC11 | 5 | cohesive FEP failure |
| FEP/BYNEL™ 3101 | BC11 | 5 | 14.08 |
| FEP/VESTAMID™ L2140 | COMP11 | 5 | 0 |

TABLE 3A-continued

| Sample | BC | Irradiation time at 254 nm (min) | Peel Strength (N/cm) |
|---|---|---|---|
| FEP/BYNEL ™ 3101 | COMP11 | 5 | 0 |
| FEP/VESTAMID ™ L2140 | BC12 | 10 | cohesive FEP failure |
| FEP/BYNEL ™ 3101 | BC12 | 10 | 8.8 |
| FEP/VESTAMID ™ L2140 | COMP12 | 10 | 0 |
| FEP/BYNEL ™ 3101 | COMP12 | 10 | 0 |

TABLE 3B

| Sample | BC | Irradiation time at 254 nm (min) | Peel Strength (N/cm) |
|---|---|---|---|
| FEP/VESTAMID ™ L2140 | BC13 | 5 | >22.8 |
| FEP/BYNEL ™ 3101 | BC13 | 5 | 15.8 |
| FEP/VESTAMID ™ L2140 | COMP13 | 5 | 0 |
| FEP/BYNEL ™ 3101 | COMP13 | 5 | 0 |
| FEP/VESTAMID ™ L2140 | BC14 | 5 | >12.3 |
| FEP/BYNEL ™ 3101 | BC14 | 5 | 12.3 |
| FEP/VESTAMID ™ L2140 | COMP14 | 5 | 0 |
| FEP/BYNEL ™ 3101 | COMP14 | 5 | 0 |
| FEP/VESTAMID ™ L2140 | BC15 | 5 | 6.1 |
| FEP/BYNEL ™ 3101 | BC15 | 5 | 7.0 |
| FEP/VESTAMID ™ L2140 | COMP15 | 5 | 0 |
| FEP/BYNEL ™ 3101 | COMP15 | 5 | 0 |
| FEP/VESTAMID ™ L2140 | BC16 | 5 | >22.8 |
| FEP/BYNEL ™ 3101 | BC16 | 5 | 12.3 |
| FEP/VESTAMID ™ L2140 | COMP16 | 5 | 0 |
| FEP/BYNEL ™ 3101 | COMP16 | 5 | 0 |
| FEP/VESTAMID ™ L2140 | BC17 | 5 | >19.3 |
| FEP/BYNEL ™ 3101 | BC17 | 5 | 7.9 |
| FEP/VESTAMID ™ L2140 | COMP17 | 5 | 1.8 |
| FEP/BYNEL ™ 3101 | COMP17 | 5 | 0 |
| FEP/VESTAMID ™ L2140 | BC18 | 5 | 7.9 |
| FEP/BYNEL ™ 3101 | BC18 | 5 | 9.7 |
| FEP/VESTAMID ™ L2140 | COMP18 | 5 | 0 |
| FEP/BYNEL ™ 3101 | COMP18 | 5 | 0 |
| FEP/VESTAMID ™ L2140 | BC19 | 5 | 24.6 |
| FEP/BYNEL ™ 3101 | BC19 | 5 | 8.8 |
| FEP/VESTAMID ™ L2140 | COMP19 | 5 | 0 |
| FEP/BYNEL ™ 3101 | COMP19 | 5 | 0 |
| FEP/VESTAMID ™ L2140 | BC20 | 5 | >22.8 |
| FEP/BYNEL ™ 3101 | BC20 | 5 | 12.3 |
| FEP/VESTAMID ™ L2140 | COMP20 | 5 | 0 |
| FEP/BYNEL ™ 3101 | COMP20 | 5 | 0 |

TABLE 3C

| Sample | BC | Irradiation time at 254 nm (min) | Peel Strength (N/cm) |
|---|---|---|---|
| FEP/VESTAMID ™ L2140 | BC21 | 5 | 8.8 |
| FEP/BYNEL ™ 3101 | BC21 | 5 | 30.7 |
| FEP/VESTAMID ™ L2140 | COMP21 | 5 | 0 |
| FEP/BYNEL ™ 3101 | COMP21 | 5 | 0 |
| FEP/VESTAMID ™ L2140 | BC22 | 5 | >22.8 |
| FEP/BYNEL ™ 3101 | BC22 | 5 | 12.3 |
| FEP/VESTAMID ™ L2140 | COMP22 | 5 | 0 |
| FEP/BYNEL ™ 3101 | COMP22 | 5 | 0 |
| FEP/VESTAMID ™ L2140 | BC23 | 10 | 26.3 |
| FEP/BYNEL ™ 3101 | BC23 | 10 | 30.7 |
| FEP/VESTAMID ™ L2140 | COMP23 | 5 | 0 |
| FEP/BYNEL ™ 3101 | COMP23 | 5 | 0 |
| FEP/VESTAMID ™ L2140 | BC24 | 5 | 17.5 |
| FEP/BYNEL ™ 3101 | BC24 | 5 | 29.8 |
| FEP/VESTAMID ™ L2140 | COMP24 | 5 | 0 |
| FEP/BYNEL ™ 3101 | COMP24 | 5 | 0 |
| FEP/VESTAMID ™ L2140 | BC25 | 5 | 14.9 |
| FEP/BYNEL ™ 3101 | BC25 | 5 | 13.2 |
| FEP/VESTAMID ™ L2140 | COMP25 | 5 | 0 |
| FEP/BYNEL ™ 3101 | COMP2S | 5 | 0 |
| FEP/VESTAMID ™ L2140 | BC26 | 5 | 7.0 |
| FEP/BYNEL ™ 3101 | BC26 | 5 | 33.3 |
| FEP/VESTAMID ™ L2140 | COMP26 | 5 | 0 |
| FEP/BYNEL ™ 3101 | COMP26 | 5 | 0 |
| FEP/EXACT ™ 4015 | BC27 | 10 | 6.1 |
| FEP/VESTAMID ™ L2140 | BC28 | 5 | >15.8 |

Example 5

This comparative example shows that electron donors are not effective at promoting bonding according to the invention. Table 4 shows the bonding results obtained when electron donors were used as a 10 weight percent solution in methanol according to the procedure of Example 1.

TABLE 4

| Sample | Electron Donor as a 10 wt % in Methanol | Irradiation Time at 254 nm (min) | Peel (N/cm) |
|---|---|---|---|
| FEP/VESTAMID ™ L2140 | Allylamine | 5 | 0 |
| FEP/Bynel 3101 | Allylamine | 5 | 0 |
| FEP/VESTAMID ™ L2140 | n-butylamine | 5 | 0 |
| FEP/Bynel 3101 | n-butylamine | 5 | 0 |
| FEP/VESTAMID ™ L2140 | 3-aminopropyl-triethoxysilane | 5 | 0 |
| FEP/Bynel 3101 | 3-aminopropyl-triethoxysilane | 5 | <1.75 |
| FEP/VESTAMID ™ L2140 | 2-aminoethanol | 5 | <1.75 |
| FEP/Bynel 3101 | 2-aminoethanol | 5 | <1.75 |
| FEP/VESTAMID ™ L2140 | 1,2-ethylenediamine | 5 | <1.75 |
| FEP/Bynel 3101 | 1,2-ethylenediamine | 5 | <1.75 |

Other embodiments are within the scope of the following claims.

What is claimed is:

1. An article comprising:
   a first subsrate having a surface; and
   a second substrate having a surface,
   wherein the surface of the first substrate contacts the surface of the second substrate, and
   wherein each of the first and second substrates in independently comprise a matrix material selected from a metal, a glass, an organic-inorganic composite, a fluropolymer, and a non-fluoropolymer polymer with the proviso that at least one of the first substrate and the second substrate is a fluoropolymer that forms a mixture with a bonding composition, wherein the bonding compositton includes a light-absorbing compound that absorbs light between 200 nm and 400 nm, and an electron donor that is distinct from the light absorbing compound, such that when the bonding composition is exposed to actinic radiation of a wavelength that is absorbed by the light-absorbing compound, free radicals are generated at the interface of the first and second substrates thereby enhancing the bonding of the first substrate to the second substrate, further wherein the electron donor is an alkylamine.

2. The article of claim 1, wherein the alkylamine is a fiuoroalkylamine.

3. The article of claim 1, wherein the fluoropolymer is a perfluorinated polymer.

4. The article of claim 1, wherein the fluoropolymer is a partially fluorinated polymer.

5. The article of claim 1, wherein the second substrate is selected from the group consisting of a metal and a glass.

6. The article of claim 1, wherein the second substrate includes non-fluornated polymer.

7. An article comprising:
a first substrate having a surface; and
a second substrate having a surface,
wherein the surface of the first substrate contacts the surface of the second substrate, and
wherein each of the first and second substrates independently comprise a matrix material selected from a metal, a glass, an organic-inorganic composite, a fluropolymer, and a non-fluoropolymer polymer with the proviso that at least one of the first substrate and the second substrate is a fluoropolymer that forms a mixture with a bonding composition, wherein the bonding compositton includes a light-absorbing compound that absorbs light between 200 nm and 400 nm, and an electron donor that is distinct from the light absorbing compound, such that when the bonding composition is exposed to actinic radiation of a wavelength that is absorbed by the light-absorbing compound, free radicals are generated at the interface of the first and second substrates thereby enhancing the bonding of the first substrate to the second substrate, further wherein the electron donor is an amino-substituted organosilane having a hydrolyzable substituent.

8. The article of claim 7, wherein the fluropolymer is a perfluorinated polymer.

9. The article claim 7, wherein the fluoropolymer is a partially fluorinated polymer.

10. The article of claim 7, wherein the second substrate is selected from the group consisting of a metal and a glass.

11. The article of claim 7, wherein the second substrate includes a non-fluorinated polymer.

* * * * *

UNITED STATES PATENT AND TRADEMARK OFFICE
CERTIFICATE OF CORRECTION

PATENT NO. : 7,235,302 B2
APPLICATION NO. : 10/647523
DATED : June 26, 2007
INVENTOR(S) : Naiyong Jing It is certified that error appears in the above-identified patent and that said Letters Patent is hereby corrected as shown below:

Title Page, Column 2 (Other Publication) – Line 6 – Delete "Kawananishi." and insert -- Kawanishi. --, therefor.

Title Page, Column 2 (Other Publication) – Line 21 – Delete "r.L;" and insert -- R.L; --, therefor.

Title Page, Column 2 – Line 26 – Delete "Goughlin," and insert -- Coughlin, -- therefor.

Title Page, Column 2 – Line 31 – Delete "Kaprinindis," and insert -- Kaprinidis, --, therefor.

Column 1 – Line 49 (Approx.) – Delete "e,g.," and insert -- e.g., --, therefor.

Column 8 – Line 48 – Delete "tetrafluorethylene" and insert -- tetrafluoroethylene --, therefor.

Column 8 – Line 50 – Delete "teterafluoroethylene" and insert -- tetrafluoroethylene --, therefor.

Column 10 – Line 7 – Delete "Conn," and insert -- Conn). --, therefor.

Column 10 – Line 29 (Approx.) – Delete "(1" and insert -- 1 --, therefor.

Column 10 – Line 52 – Delete "1 B." and insert -- 1B. --, therefor. (Consider space)

Column 12 – Line 64 – Delete "3 A-4" and insert -- 3A-4 --, therefor. (Consider space)

Column 13 (Table 2A) – Line 37 (Approx.) -After "(0.2 g)" delete "in".

Column 13 (Table 2B) – Line 53 (Approx.) - Delete "(2.0)" and insert -- (2.0 g) --, therefor.

Column 16 (Table 3C) – Line 13 (Approx.) - Delete "COMP2S" and insert -- COMP25 --, therefor.

Column 16 – Line 56 – In Claim 1, delete "subsrate" and insert -- substrate --, therefor.

Column 16 – Line 60 – In Claim 1, after "substrates" delete "in".

UNITED STATES PATENT AND TRADEMARK OFFICE
CERTIFICATE OF CORRECTION

PATENT NO.         : 7,235,302 B2
APPLICATION NO. : 10/647523
DATED                  : June 26, 2007
INVENTOR(S)       : Naiyong Jing It is certified that error appears in the above-identified patent and that said Letters Patent is hereby corrected as shown below:

Column 16 – Line 63 – In Claim 1, delete "flur opolymer," and insert -- fluoropolymer, --, therefor.

Column 16 – Line 63 – In Claim 1,
    delete "non-fluoropolymer" and
    insert -- non-fluorinated --, therefor.

Column 16 – Line 67 – In Claim 1, delete "compositton" and insert -- composition --, therefor.

Column 17 – Line 11 – In Claim 2, delete "fiuoroalkylamine" and insert -- fluoroalkylamine --, therefor.

Column 17 – Line 19 – In Claim 6, delete "non-fluornated" and insert -- a non-fluorinated --, therefor.

Column 18 – Line 2 – In Claim 7, delete "flur opolymer," and insert -- fluoropolymer, --, therefor.

Column 18 – Line 2 – In Claim 7, delete "non-fluoropolymer" and insert -- non-fluorinated --, therefor.

Column 18 – Line 6 – In Claim 7, delete "compositton" and insert -- composition --, therefor.

Column 18 – Line 17 – In Claim 8, delete "flur opolymer" and insert -- fluoropolymer --, therefor.

UNITED STATES PATENT AND TRADEMARK OFFICE
CERTIFICATE OF CORRECTION

PATENT NO. : 7,235,302 B2
APPLICATION NO. : 10/647523
DATED : June 26, 2007
INVENTOR(S) : Naiyong Jing It is certified that error appears in the above-identified patent and that said Letters Patent is hereby corrected as shown below:

Column 18 – Line 19 – In Claim 9, after "article" insert -- of --.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,235,302 B2
APPLICATION NO. : 10/647523
DATED : June 26, 2007
INVENTOR(S) : Naiyong Jing It is certified that error appears in the above-identified patent and that said Letters Patent is hereby corrected as shown below:

Title Page, Column 2, (Other Publication) – Line 6 – Delete "Kawananishi." and insert -- Kawanishi. --, therefor.

Title Page, Column 2 (Other Publication) – Line 21 – Delete "r.L;" and insert -- R.L; --, therefor.

Title Page, Column 2 – Line 26 – Delete "Goughlin," and insert -- Coughlin, -- therefor.

Title Page, Column 2 – Line 31 – Delete "Kaprinindis," and insert -- Kaprinidis, --, therefor.

Column 1 – Line 49 (Approx.) – Delete "e,g.," and insert -- e.g., --, therefor.

Column 8 – Line 48 – Delete "tetrafluorethylene" and insert -- tetrafluoroethylene --, therefor.

Column 8 – Line 50 – Delete "teterafluoroethylene" and insert -- tetrafluoroethylene --, therefor.

Column 10 – Line 7 – Delete "Conn," and insert -- Conn). --, therefor.

Column 10 – Line 29 (Approx.) – Delete "(1" and insert -- 1 --, therefor.

Column 10 – Line 52 – Delete "1 B." and insert -- 1B. --, therefor. (Consider space)

Column 12 – Line 64 – Delete "3 A-4" and insert -- 3A-4 --, therefor. (Consider space)

Column 13 (Table 2A) – Line 37 (Approx.) -After "(0.2 g)" delete "in".

Column 13 (Table 2B) – Line 53 (Approx.) - Delete "(2.0)" and insert -- (2.0 g) --, therefor.

Column 16 (Table 3C) – Line 13 (Approx.) - Delete "COMP2S" and insert --COMP25 --, therefor.

Column 16 – Line 56 – In Claim 1, delete "subsrate" and insert -- substrate --, therefor.

Column 16 – Line 60 – In Claim 1, after "substrates" delete "in".

UNITED STATES PATENT AND TRADEMARK OFFICE
CERTIFICATE OF CORRECTION

PATENT NO. : 7,235,302 B2
APPLICATION NO. : 10/647523
DATED : June 26, 2007
INVENTOR(S) : Naiyong Jing It is certified that error appears in the above-identified patent and that said Letters Patent is hereby corrected as shown below:

Column 16 – Line 63 – In Claim 1, delete "fluropolymer," and insert --fluoropolymer, --, therefor.

Column 16 – Line 63 – In Claim 1,
   delete "non-fluoropolymer" and
   insert -- non-fluorinated --, therefor.

Column 16 – Line 67 – In Claim 1, delete "compositton" and insert -- composition --, therefor.

Column 17 – Line 11 – In Claim 2, delete "fiuoroalkylamine" and insert -- fluoroalkylamine --, therefor.

Column 17 – Line 19 – In Claim 6, delete "non-fluornated" and insert -- a non-fluorinated --, therefor.

Column 18 – Line 2 – In Claim 7, delete "fluropolymer," and insert -- fluoropolymer, --, therefor.

Column 18 – Line 2 – In Claim 7, delete "non-fluoropolymer" and insert -- non-fluorinated --, therefor.

Column 18 – Line 6 – In Claim 7, delete "compositton" and insert -- composition --, therefor.

Column 18 – Line 17 – In Claim 8, delete "fluropolymer" and insert -- fluoropolymer --, therefor.

UNITED STATES PATENT AND TRADEMARK OFFICE
CERTIFICATE OF CORRECTION

PATENT NO.        : 7,235,302 B2
APPLICATION NO.   : 10/647523
DATED             : June 26, 2007
INVENTOR(S)       : Naiyong Jing It is certified that error appears in the above-identified patent and that said Letters Patent is hereby corrected as shown below:

Column 18 – Line 19 – In Claim 9, after "article" insert -- of --.

This certificate supersedes Certificate of Correction issued November 20, 2007.

Signed and Sealed this

Twenty-fifth Day of December, 2007

JON W. DUDAS
*Director of the United States Patent and Trademark Office*